(12) United States Patent
Johansson

(10) Patent No.: US 11,584,186 B2
(45) Date of Patent: Feb. 21, 2023

(54) LOAD CARRYING VEHICLE HAVING A CONTAINER AND METHOD FOR CONTROLLING THE LOAD CARRYING VEHICLE

(71) Applicant: Volvo Construction Equipment AB, Eskilstuna (SE)

(72) Inventor: Eric Johansson, Gothenburg (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 17/525,288

(22) Filed: Nov. 12, 2021

(65) Prior Publication Data

US 2022/0153082 A1 May 19, 2022

(30) Foreign Application Priority Data

Nov. 13, 2020 (EP) .................................... 20207495

(51) Int. Cl.
*B60G 17/04* (2006.01)
(52) U.S. Cl.
CPC .......... *B60G 17/04* (2013.01); *B60G 2300/02* (2013.01); *B60G 2800/203* (2013.01); *B60G 2800/22* (2013.01)
(58) Field of Classification Search
CPC ............................................... B60G 2300/02
See application file for complete search history.

(56) References Cited

U.S. PATENT DOCUMENTS

| 3,106,410 | A | | 10/1963 | Walter | |
|---|---|---|---|---|---|
| 5,165,838 | A | * | 11/1992 | Kallansrude | B60G 17/04 414/535 |
| 8,157,499 | B1 | | 4/2012 | Jones | |
| 2011/0035104 | A1 | * | 2/2011 | Smith | B60G 17/017 280/6.151 |
| 2017/0253166 | A1 | * | 9/2017 | Rezvanian | B60P 1/027 |

FOREIGN PATENT DOCUMENTS

WO 2004106110 A1 12/2004

OTHER PUBLICATIONS

Extended European Search Report dated Apr. 15, 2021 for European Patent Application No. 20207495.1, 5 pages.

* cited by examiner

*Primary Examiner* — James A English
*Assistant Examiner* — Matthew James O'Neill
(74) *Attorney, Agent, or Firm* — Sage Patent Group

(57) ABSTRACT

A load carrying vehicle including: a chassis; a load carrying container connected to the chassis; a plurality of wheels; a suspension arrangement coupling the wheels to the chassis; wherein the suspension arrangement is configured to controllably lower the container such that the container makes contact with at least two wheels.

15 Claims, 3 Drawing Sheets

LOAD CARRYING VEHICLE HAVING A CONTAINER AND METHOD FOR CONTROLLING THE LOAD CARRYING VEHICLE

CROSS-REFERENCE TO RELATED APPLICATIONS

The present application claims benefit of priority to European Patent Application No. 20207495.1, filed Nov. 13, 2020, and is assigned to the same assignee as the present application and is incorporated herein by reference.

TECHNICAL FIELD

The present disclosure relates to a load carrying vehicle adapted to receive heavy loads and to a method for controlling such a load carrying vehicle. In particular, the method and system relate to a suspension arrangement of a load carrying vehicle.

Embodiments described herein are applicable on load carrying vehicles within the fields of industrial construction machines or construction equipment, in particular dumpers, haulers, articulated haulers and the like. Although embodiments will be described with respect to a hauler, the inventive concepts are not restricted to this particular machine, but may also be used in other load carrying vehicles having a container.

BACKGROUND

In connection with transportation of heavy loads, e.g. in construction work, work machines are frequently used. A work machine may be operated with large and heavy loads in areas where there are no roads, for example for transports in connection with road or tunnel building, sand pits, mines and similar environments.

Load carrying work machines such as an articulated hauler or dumper are typically used to transport heavy loads shorter distances and over rough terrain. Current load carrying vehicles have containers that need to be strongly dimensioned in order to be able to receive dumped loads, e.g. up to 60 tons per load from a cable-operated excavator, meaning that the container needs to be able to withstand the increased stress resulting from dumping a heavy load onto the container.

However, the construction required to withstand the stress during loading results in a high vehicle weight which is higher than if the vehicle was dimensioned to only transport the load. The high weight in turn leads to a higher fuel consumption. Accordingly, it is desirable to reduce the vehicle weight without affecting the load carrying capacity of the vehicle.

SUMMARY

An object of the inventive concepts is to provide an improved load carrying vehicle capable of receiving heavy loads.

According to a first aspect of the inventive concepts, there is provided a load carrying vehicle comprising: a chassis; a load carrying container connected to the chassis; a plurality of wheels; a suspension arrangement coupling the wheels to the chassis; wherein the suspension arrangement is configured to controllably lower the container such that the container makes contact with at least two wheels.

In the present context, the chassis comprises the structural frame of the vehicle, and the load carrying container may for example be connected to the chassis so that the container can be tilted in relation to the chassis when tipping a load. The tilt can for example be achieved by dedicated hydraulic tilt cylinders located between the chassis and the container. In such an implementation, the container may be connected to the chassis by two joints allowing the container to be tilted, and when the container is in a horizontal position, it may rest on and be supported by the chassis at one or more points.

In the described load carrying vehicle, a controllable suspension arrangement couples the wheels to the chassis, meaning that the weight of the chassis, and thereby of the container, is transferred to the wheels via the suspension arrangement when the suspension arrangement is in a transport mode which can be considered to be the normal operating mode. Moreover, the suspension arrangement is configured to controllably lower the container such that the container makes contact with at least two wheels. Thereby, some or all of the weight of the chassis and the container is carried directly by the wheels, and the weight of the container does not burden the chassis.

The present inventive concepts are based on the realization that a load carrying vehicle where the weight of the container can be carried by the wheels instead of the chassis, in particular when loading the vehicle, can be made with a lighter chassis. Thereby, manufacturing costs can be lowered, and the fuel efficiency of the vehicle can be improved without sacrificing reliability.

According to one embodiment of the inventive concepts, the container is configured to make contact with an opposing pair of wheels. This prevents the vehicle from tilting during loading and also ensures that the load can be carried equally on both sides of the vehicle. Moreover, for a vehicle where the container is located above four or more wheels, the container may rest evenly on all wheels. This can be achieved by a suspension arrangement which is capable of lowering the container and the chassis in relation to all wheels of the vehicle. The term "opposing wheels" is here used to describe two wheels arranged on opposite sides of a vehicle, such as a left rear wheel and a right rear wheel.

According to one embodiment of the inventive concepts, a portion of the container configured to make contact with a corresponding wheel is advantageously a fender of the container which is arranged and configured to make contact with a tire of a corresponding wheel. It is advantageous to use the fenders since it would only require minor modifications of existing container designs. Moreover, the fenders or other portions of the container arranged to make contact with the tires may be suitably reinforced to withstand the forces acting on the container during loading.

According to one embodiment of the inventive concepts, the vehicle is configured to operate in a load receiving mode in which the container is in a lowered position resting on the wheels. In the load receiving mode, the container can be assumed to be in a position so that little or no weight is carried by the suspension arrangement, thereby reducing or eliminating the load carried by the chassis.

According to one embodiment of the inventive concepts, the suspension arrangement is further configured to, in the load receiving mode, elevate the container at a beginning of a load sequence and to gradually lower the container to a position resting on the wheels during the load sequence. In the present context, the load sequence can be described to include a first action where the container is elevated. However, the container may already be in an elevated position so that the load sequence begins with the container already being elevated. In either case, in an embodiment where the container is in an elevated position when the container receives the load, the suspension arrangement is configured to lower the container onto the wheels of the vehicle as the weight of the load in the container increases or passes a certain threshold value. The speed of the lowering is preferably limited such that the container does not abruptly come down onto the tires. On the other hand, the speed of lowering is preferably not so low so that the full weight of the container and load is taken by the chassis for an extended time period.

According to one embodiment of the inventive concepts, the suspension arrangement comprises an overflow valve configured to release pressure from the suspension arrangement if a pressure in the suspension arrangement exceeds a predetermined threshold value, such that the container is lowered by the suspension arrangement. The overflow valve is preferably dimensioned such that the container is lowered well before there is a risk that the chassis or suspension arrangement is damaged by an excessive load on the container.

According to one embodiment of the inventive concepts, the vehicle is further configured to operate in a braking mode in which the container is controlled to be in a lowered position such that a contact frictional force between the container and the wheels brakes the vehicle. By means of the controllable suspension arrangement, the brakes of the vehicle can be relieved, which may be advantageous in long downhill travels or for heavy loads.

According to one embodiment of the inventive concepts, the vehicle is further configured to operate in a transport mode in which the container is controlled to be in a raised position such that there is no contact between the container and the wheels and where the weight of the container is carried by the suspension arrangement.

According to one embodiment of the inventive concepts, the suspension arrangement may be a hydraulic suspension arrangement comprising a plurality of hydraulic springs. The hydraulic suspension arrangement may then comprise a plurality of hydraulic cylinders connecting each wheel to the chassis, at least one hydraulic accumulator connected to the hydraulic cylinders, a hydraulic pump connected to the hydraulic cylinders and a hydraulic control system configured to control the hydraulic cylinders.

According to one embodiment of the inventive concepts, the load carrying vehicle may be an autonomous vehicle.

According to a second aspect of the inventive concepts, there is provided a method of operating a load carrying vehicle comprising: a chassis, a load carrying container connected to the chassis; a plurality of wheels and a controllable suspension arrangement configured to couple the wheels to the chassis, the method comprising: in a load receiving mode, controlling the suspension arrangement to lower the container such that the container rests on at least two wheels of the vehicle.

According to one embodiment of the inventive concepts, the method further comprises, in the load receiving mode, elevating the container at a beginning of a load sequence and gradually lowering the container to a position resting on the wheels during the load sequence.

According to one embodiment of the inventive concepts, the method further comprises, in a transport mode, controlling the suspension arrangement to be in a raised position such that there is no contact between the container and the wheels and where the weight of the container is carried by the suspension arrangement.

According to one embodiment of the inventive concepts, the method further comprises, in a braking mode, controlling the suspension arrangement to be in a lowered position such that a contact friction between the container and the wheels brakes the vehicle.

Further effects and features of this second aspect of the present inventive concepts are largely analogous to those described above in connection with the first aspect of the inventive concepts.

Further advantages and advantageous features of the inventive concepts are disclosed in the following description and in the dependent claims.

BRIEF DESCRIPTION OF THE DRAWINGS

With reference to the appended drawings, below follows a more detailed description of embodiments of the inventive concepts cited as examples.

In the drawings.

DETAILED DESCRIPTION OF EXAMPLE EMBODIMENTS

In the present detailed description, various embodiments of a load carrying vehicle and a method for controlling the load carrying vehicle according to the present invention are mainly discussed with reference to a hauler comprising a container. It should however be noted that this by no means limits the scope of the present inventive concepts since the described inventive concepts are equally applicable in other types of load carrying vehicles having a container.

Figure 1:
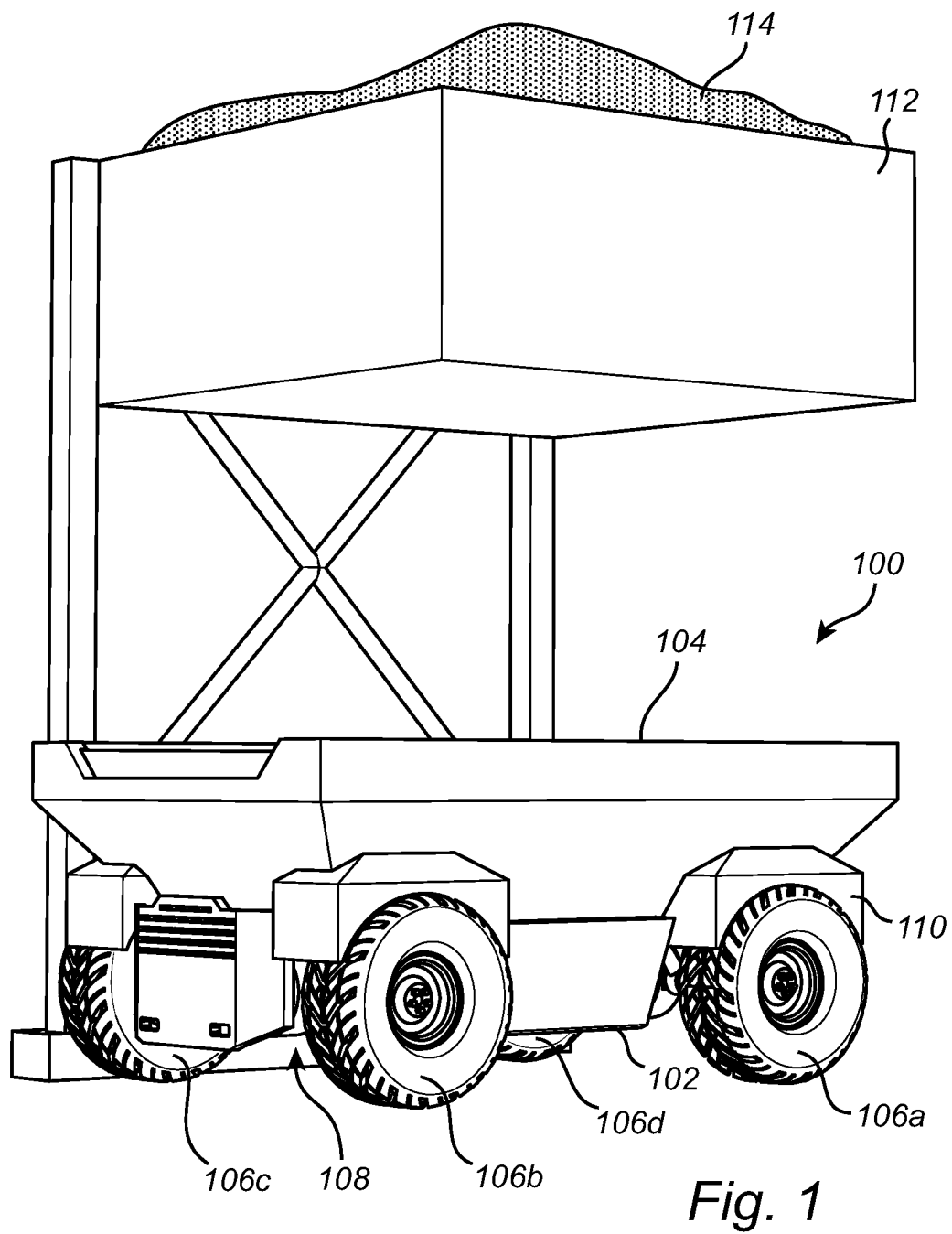
FIG. 1 is a schematic illustration of a load carrying vehicle according to an embodiment.

FIG. 1 schematically illustrates a load carrying vehicle 100 in the form of a hauler. The load carrying vehicle 100 comprises a chassis 102, a load carrying container 104 connected to the chassis 102, a plurality of wheels 106a-d, a suspension arrangement 108 coupling the wheels 106a-d to the chassis 102. The suspension arrangement 108 is configured to controllably lower the container 104 such that the container 104 makes contact with at least two of the wheels 106a-d. The container 104 may be tiltable in relation to the chassis 102 using hydraulic cylinders, so that the load can be tipped at a drop-off location.

In the illustrated example, the container 104 is configured so that four fenders 110 of the container 104 make contact with a corresponding wheel. The fenders 110 are preferably reinforced to be able to withstand the forces acting on the container 104 when the load is dropped thereon. In the illustrated embodiment, the suspension arrangement 108 is controlled to lower the container 104 so that the container 104 contacts the wheels 106a-d and so that the full weight of the container 104 is thereby carried directly by the wheels 106a-d, and not by the chassis 102 and the suspension arrangement 108 in itself. Thereby, it is the tires and rims of the wheels 106 a-d that absorb any shocks occurring when dropping the load onto the container 104.

FIG. 1 further illustrates that the load carrying vehicle 100 is located under a loading station 112, where a full container load of material 114 can be dropped into the container 104 in one pass. The container 104 may also be filled by any other type of loading arrangement, such as a mining shovel or the like. Moreover, the illustrated load carrying vehicle 100 is an autonomous vehicle. However, various embodiments are equally applicable for manually controlled or semi-autonomous vehicles.

Figure 2:
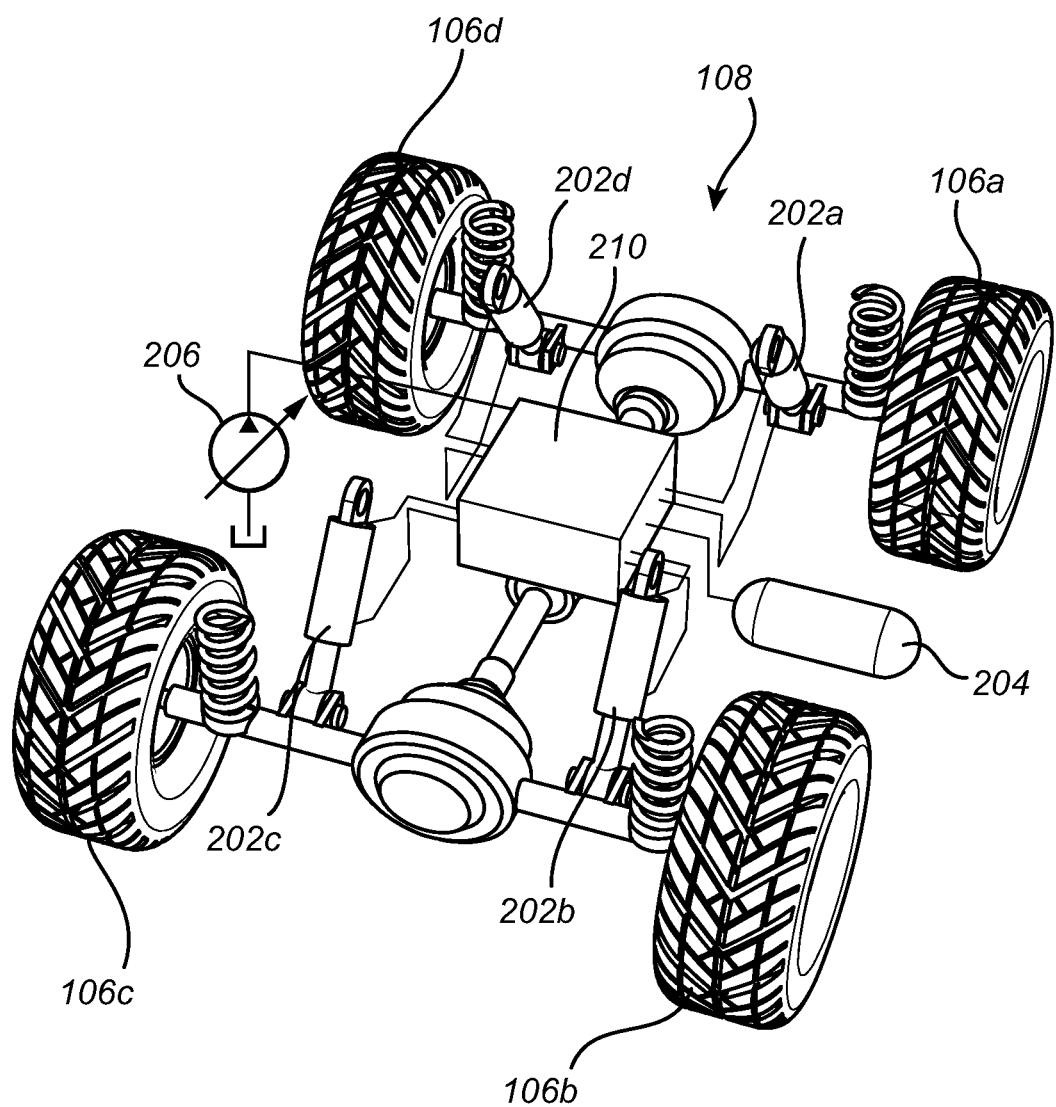
FIG. 2 is a schematic illustration of a suspension arrangement of a load carrying vehicle according to an embodiment.

In FIG. 2, an example embodiment of a suspension arrangement 108 is illustrated. In particular, the illustrated suspension arrangement 108 is a hydraulic suspension arrangement comprising a plurality of hydraulic springs 202a-d, here one hydraulic spring for each of the four wheels 106a-d. The hydraulic spring may be embodied by and/or comprise a hydraulic cylinder as illustrated in FIG. 2. The hydraulic cylinders 202a-d connect each wheel to the chassis 102 which in turn is connected to the container 104. The suspension arrangement 108 further comprises at least one hydraulic accumulator 204 connected to the hydraulic cylinders 202a-d, a hydraulic pump 206 connected to the hydraulic cylinders 202a-d and a hydraulic control system 210 configured to control the hydraulic cylinders 202a-d and any other hydraulic components of the hydraulic suspension arrangement 108 such as the hydraulic pump 206. The hydraulic accumulator 204 can for example be used to recuperate energy when lowering the container 104, and to provide hydraulic energy when the container 104 needs to be lifted from the wheels.

The suspension arrangement 108 may further comprise an overflow valve configured to release pressure from the suspension arrangement 108 if a pressure in the suspension arrangement 108 exceeds a predetermined threshold value, such that the container 104 is lowered by the suspension arrangement 108. In the illustrated hydraulic suspension arrangement 108, the overflow valve is a hydraulic overflow valve, e.g. a relief valve (not illustrated). The functionality of the hydraulic relief valve may for example be part of a valve block of the hydraulic control system 210. Even though the described suspension arrangement 108 is a hydraulic suspension arrangement, the described functionality would also be achievable with other types of suspensions, such as pneumatic suspension, or a combination of the two.

Figure 3:
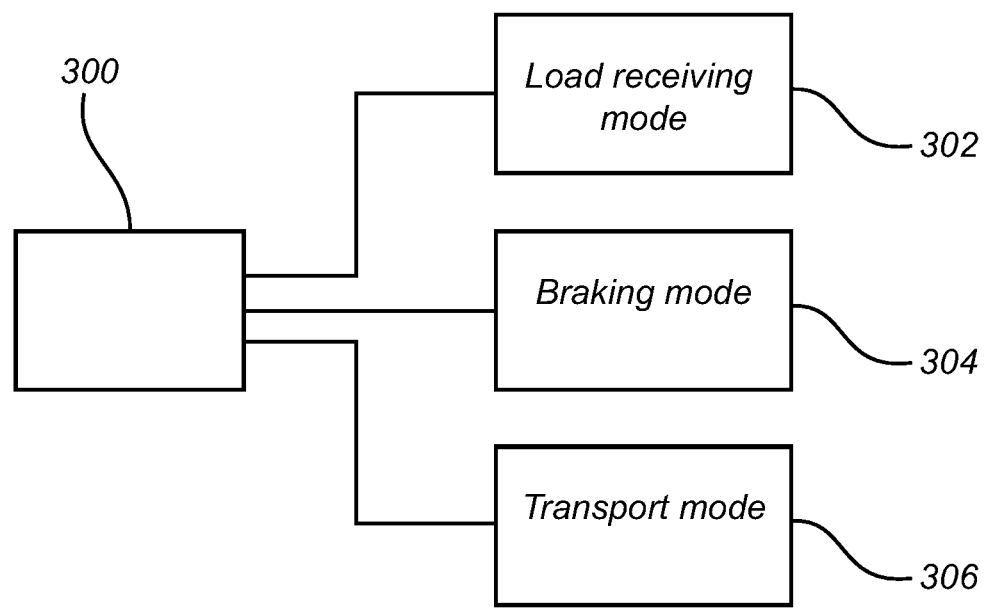
FIG. 3 is a flow chart outlining steps of a method according to an embodiment.

FIG. 3 is a flow chart illustrating a method 300 of operating the load carrying described above. The method may comprise controlling the suspension arrangement 108 to operate in one of a plurality of operating modes. The method comprises controlling the suspension arrangement 108 to operate in a load receiving mode 302 in which the container 104 is in a lowered position resting on the wheels. Thereby, the container 104 is ready for loading. Moreover, the vehicle 100 is prevented from moving in the load receiving mode since the friction between the wheels 106a-d and the container 104 holds the vehicle in place.

The suspension arrangement 108 may further be configured to elevate the container 104 at a beginning of a load sequence and to gradually lower the container 104 to a position resting on the wheels 106a-d during the load sequence. The described elevation may be part of the load receiving mode, or it may be defined as a separate mode where the lowering of the container 104 is controlled such that there is no risk of damage to the chassis. The lowering may for example be controlled by the previously described overflow valve.

The method may further comprise operating the vehicle 100 in a braking mode 304 in which the container 104 is controlled to be in a lowered position such that a contact friction between the container 104 and the wheels 106a-d brakes the vehicle. In the braking mode, the container 104 can be controlled to have an elevation which is sufficient for achieving the desired braking. Accordingly, the suspension arrangement 108 is controlled to lower the container 104 to control how much force is applied between a portion of the container 104, e.g. the fenders, and the wheels.

Moreover, the method may comprise operating the suspension arrangement 108 in a transport mode 306 in which the container 104 is controlled to be in a raised position such that there is no contact between the container 104 and the wheels 106a-d and where the weight of the container 104 is carried by the suspension arrangement. The position, i.e. the elevation, of the container 104 in the transport mode can be based on the amount of travel required in the suspension in the transport mode, which in turn depends of factors such as road conditions, container load, suspension properties etc.

Moreover, the position of the container 104 in the travel mode may be lower compared to in an elevated position used during or at the start of loading. The above described elevated position of the container 104 may be a fully elevated position, utilizing the full extension of the hydraulic cylinders.

It is to be understood that the present inventive concepts are not limited to the embodiments described above and illustrated in the drawings; rather, the skilled person will recognize that many changes and modifications may be made within the scope of the appended claims.

The invention claimed is:

1. A load carrying vehicle comprising:
   a chassis;
   a load carrying container connected to the chassis;
   a plurality of wheels; and
   a suspension arrangement coupling the wheels to the chassis;
   wherein the suspension arrangement is configured to controllably lower the container such that the container makes contact with at least two wheels.

2. The load carrying vehicle according to claim 1, wherein the container is configured to make contact with an opposing pair of wheels.

3. The load carrying vehicle according to claim 1, wherein a portion of the container configured to make contact with a corresponding wheel is a fender of the container arranged and configured to make contact with a tire of a corresponding wheel.

4. The load carrying vehicle according to claim 1, wherein the vehicle is configured to operate in a load receiving mode in which the container is in a lowered position resting on the wheels.

5. The load carrying vehicle according to claim 4, wherein the suspension arrangement is further configured to, in the load receiving mode, elevate the container at a beginning of a load sequence and to gradually lower the container to a position resting on the wheels during the load sequence.

6. The load carrying vehicle according to claim 5, wherein the suspension arrangement comprises an overflow valve configured to release pressure from the suspension arrangement if a pressure in the suspension arrangement exceeds a predetermined threshold value, such that the container is lowered by the suspension arrangement.

7. The load carrying vehicle according to claim 1, wherein the vehicle is configured to operate in a braking mode in which the container is controlled to be in a lowered position such that a contact frictional force between the container and the wheels brakes the vehicle.

8. The load carrying vehicle according to claim 1, wherein the vehicle is configured to operate in a transport mode in which the container is controlled to be in a raised position such that there is no contact between the container and the wheels and such that the weight of the container is carried by the suspension arrangement.

9. The load carrying vehicle according to claim 1, wherein the suspension arrangement is a hydraulic suspension arrangement comprising a plurality of hydraulic springs.

10. The load carrying vehicle according to claim 9, wherein the hydraulic suspension arrangement comprises a plurality of hydraulic cylinders connecting each wheel to the chassis, at least one hydraulic accumulator connected to the hydraulic cylinders, a hydraulic pump connected to the hydraulic cylinders and a hydraulic control system configured to control the hydraulic cylinders.

11. The load carrying vehicle according to claim 1, wherein the vehicle is an autonomous vehicle.

12. The method of operating a load carrying vehicle comprising: a chassis, a load carrying container connected to the chassis, a plurality of wheels and a controllable suspension arrangement configured to couple the wheels to the chassis, the method comprising:

in a load receiving mode, controlling the suspension arrangement to lower the container such that the container rests on at least two wheels of the vehicle.

13. The method according to claim 12, further comprising, in the load receiving mode, elevating the container at a beginning of a load sequence and gradually lowering the container to a position resting on the wheels during the load sequence.

14. The method according to claim 12, further comprising, in a transport mode, controlling the suspension arrangement to be in a raised position such that there is no contact between the container and the wheels and where the weight of the container is carried by the suspension arrangement.

15. The method according to claim 12, further comprising, in a braking mode, controlling the suspension arrangement to be in a lowered position such that a contact friction between the container and the wheels brakes the vehicle.

* * * * *